United States Patent [19]

Broberg

[11] Patent Number: 4,940,877

[45] Date of Patent: Jul. 10, 1990

[54] PARTS IN PLACE TORCH STRUCTURE

[75] Inventor: Daniel M. Broberg, Edina, Minn.

[73] Assignee: Century Mfg. Co., Minnesota

[21] Appl. No.: 407,873

[22] Filed: Sep. 15, 1989

[51] Int. Cl.[5] .................... B23K 9/00

[52] U.S. Cl. .................... 219/121.5; 219/121.54; 219/121.52; 219/121.48; 219/75

[58] Field of Search .......... 219/121.48, 121.5, 121.51, 219/121.52, 121.54, 75; 313/231.21-231.41

[56] References Cited

U.S. PATENT DOCUMENTS

| | | | |
|---|---|---|---|
| 588,921 | 4/1986 | Wilkins et al. | 219/121.5 |
| 4,580,032 | 4/1986 | Carkhuff | 219/121.5 |
| 4,590,354 | 5/1986 | Marhic et al. | 219/121.5 |
| 4,691,094 | 9/1987 | Hatch et al. | 219/121.5 |
| 4,701,590 | 10/1987 | Hatch | 219/121.5 |
| 4,716,269 | 12/1987 | Carkhuff | 219/121.5 |
| 4,767,908 | 8/1988 | Dallavalle et al. | 219/121.5 |

*Primary Examiner*—M. H. Paschall

*Attorney, Agent, or Firm*—Leo Gregory

[57] ABSTRACT

A plasma arc cutting torch embodying an electrode having a swirl tube and a nozzle thereabout, a spring mechanism bearing on the swirl tube and nozzle being caused by them to complete a circuit, the circuit not becoming completed in the absence of one of or both the swirl tube and nozzle.

9 Claims, 2 Drawing Sheets

PARTS IN PLACE TORCH STRUCTURE

BACKGROUND OF THE INVENTION

1. Field of Invention

This invention relates to a safety mechanism for a plasma torch cutter.

2. Brief History Of The Prior Art

A plasma torch metal cutter generates substantial voltage in creating a very high metal cutting heat whereby the apparatus is a source of peril unless carefully safeguarded and armed against inadvertent use at a time when all parts are not present and in their proper place.

In the Hatch U.S. Pat. 4,701,590, a torch is provided with a spring loaded mechanism to expel an electrode and break the circuitry thereof to prevent its operation in the event of a missing part.

In Hatch U.S. Pat. No. 4,691,094, a sliding gas valve closes off the gas flow when any necessary part is not in place.

In Wilkins U.S. Pat. No. 4,585,921 there is present a predetermined measurement of the resistance between the torch tip and the workpiece and that between a person's hand to ground and if the latter resistance is below the predetermined resistance, the torch will not operate.

In Carkhuff U.S. Pat. No. 4,580,032, a safety control responds to the partial removal of a heat shield to interrupt the flow of gas and a responsive switch shuts off the gas.

It is desirable to provide a positive acting means which serves to not complete an energizing circuit unless certain essential parts which may readily and inadvertently be omitted are in fact in operating position.

SUMMARY OF THE INVENTION

It is the purpose and an object of the invention herein to embody a safety interlock element to prevent an exposure of a high cutting voltage when the protective nozzle has not been properly installed.

It is another object herein whereby the interlock element of the torch herein which triggers the circuit to make the torch operative is automatically made to be inoperative in the absence of one or more essential operating elements which inadvertently may be readily omitted.

It is a further object and an important feature herein to sense that both the swirl tube and nozzle are installed and in place to make the torch operative, systems which only sense the presence of a nozzle cap fail to be protective in the event the nozzle has not been installed. Additionally, complex systems that rely on sensing circuits located back at the plasma supply source can accidentally be fooled and fail to be protective. Furthermore, the structure herein has positive reliability and is more economical to produce.

More specifically it is an object herein to provide a coil spring to bear upon a swirl tube and nozzle, the spring responding to its compression by said swirl tube and nozzle to engage contacts and complete an energizing circuit to make the torch operative and in the absence of one of these elements, the spring fails to complete the circuit rendering the torch inoperative.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
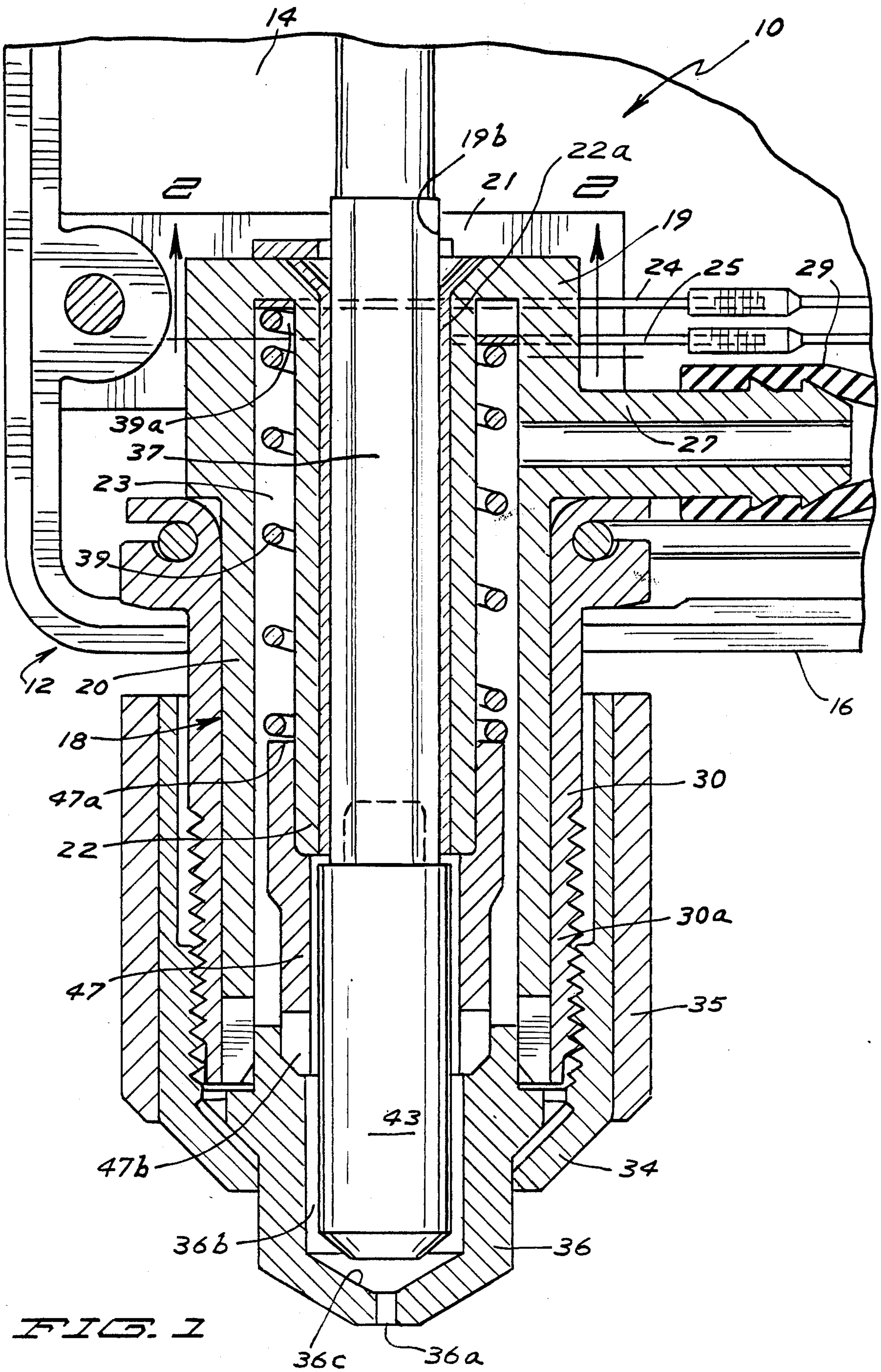
FIG. 1 is a fragmentary view of a head portion of a plasma cutting torch in vertical longitudinal cross section.
Figure 2:
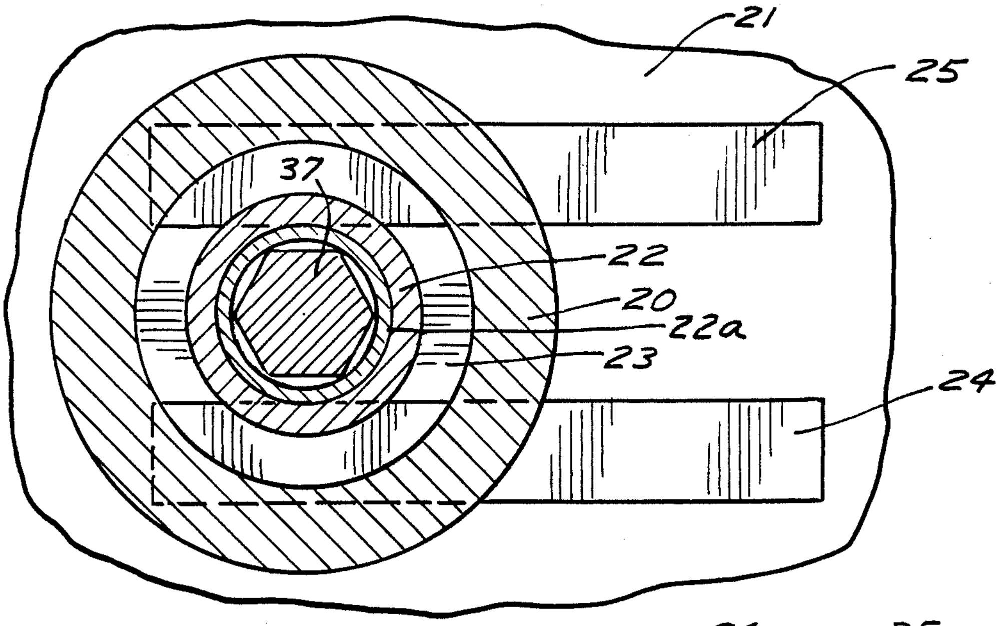
FIG. 2 is a fragmentary view in cross section taken on line 2—2 of FIG. 1 as indicated by the arrows.

Referring to the Figs., shown in cross section as the head portion of a plasma arc metal cutting torch 10 of which an embodiment is disclosed in the inventor's copending application S.N. 341,838 filed Apr. 24, 1989 now U.S. Pat. No. 4,896,016.

Said torch comprises a housing 12 having a head portion 14 from which extends an operating handle 16. Positioned within said head portion 14 and extending outwardly thereof is a plunger housing 18. Said plunger housing has a rectangular head portion 19 and a tubular body portion 20 depending therefrom, said tubular body portion having therein a concentric tubular body portion 22 depending from said head portion and said tubular portions having therebetween an annular space or passage 23.

Said head portion is received and retained by an internal housing fitting 21 which is preformed within said housing 12 in molding the same. Extending centrally upwardly through said head portion is a cylindrical passage **19*b***.

Embedded within said head portion 19 are electrical contacts 24 and 25 which extend outwardly of one side thereof as shown in FIG. 1. It will be noted that said contacts are in two planes, the contact 24 as shown, being in a plane above that of said contact 25. Said contacts are shown in better detail in FIGS. 3 and 4. Said contacts, in a suitable manner, will be included in the activating circuit C1 as described in said copending application.

Extending from said tubular body portion 20 is a nipple 27 having attached thereto as a gas conducting hose 29 which will run to a gas source not here shown. Said hose communicates with the annular passage 23.

Suitably secured in said head portion 14 and depending therefrom about said depending portion 20 of said plunger housing is a relatively short brass contact tube 30 having an externally threaded lower end portion **30*a* and threaded onto the outer end portion thereof is a nozzle cap 34 which has about the sides thereof and secured thereto a cylindrical insulating member 35. Disposed within said nozzle cap and extending outwardly thereof is a nozzle 36 having a restrictive orifice 36*a*** at its top. Although not here shown, said nozzle and nozzle cap may be formed as a unitary member.

Within said inner tubular body portion 22 is a tubular sleeve **22*a* with an inside diameter machined to close tolerance for a sliding fit of a plunger 37 which extends upwardly through said passage 19*b*** and has vertical movement. Said plunger may be round or non-round in cross section as may be desired although it is here shown to be hexagonal.

Depending from said plunger and being suitably threaded onto the lower end portion thereof is an electrode 43 and the same is indicated as being formed of copper but may be formed of other suitable material or contain a thermionic emitter.

An example of a thermionic emitter is the element hafnium, which is not shown. The plunger is connected to the plasma power supply and is the path for the high voltage to reach the electrode.

Said plunger and said electrode extend downwardly to have contact with the inner wall 36*c* of said nozzle and about said electrode is an annular passage 36*b* which communicates with the atmosphere.

Mounted about the lower portion of said tubular portion 22 and suitably retained by said nozzle 36 is a swirl tube 47 and the same has angled slots 47*b* in its wall portion to communicate with the passage 36*b*. Said swirl tube in the operation of the torch regulates and spins gas as it passes it through to said passage 36*b*. It is within the concept herein though not so shown, to regard the swirl tube as an extension of said nozzle.

Mounted within said space 23 about said tubular portion 22 and bearing down against the upper shoulder 47*a* of said swirl tube and as shown in this embodiment is a coil compression spring 39. It will be understood that other suitable resilient means may be used and said spring is referred to as a contact means.

Figure 3:
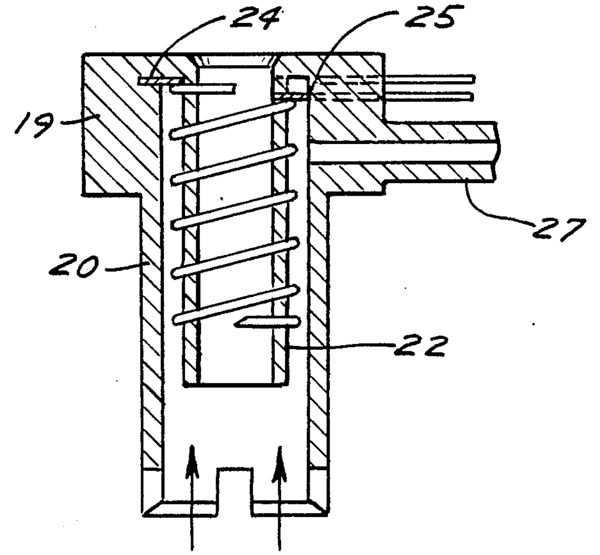
FIG. 3 is a fragmentary view of a detail in section in operating position.
Figure 4:
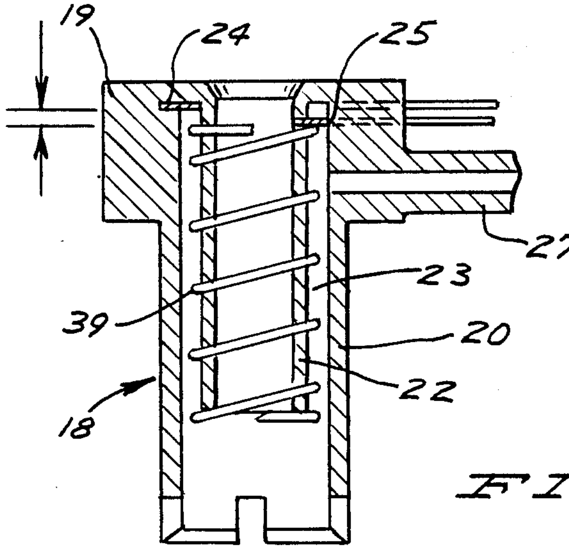
FIG. 4 is a view similar to that of FIG. 3 in a non-operative position.

With said nozzle and the swirl tube 47 in operative position, said spring is of such a length that it is compressed upwardly sufficiently to have its upper coil 39*a* make a positive engagement with both contacts 24 and 25, as shown in FIG. 3. Thus the actuating circuit of the torch will be completed and the torch made operative. In the absence of the swirl tube or nozzle, said upper coil will only engage the lower contact 25, FIG. 4, and the circuit to permit the torch to operate will not be completed and the torch is inoperative. Hence a very simple, reliable, positive acting safety feature is provided.

It will of course be understood that various changes may be made in form, details, arrangement and proportions of the parts without departing from the scope of the invention herein which, generally stated, consists of an apparatus capable of carrying out the objects above set forth, in the parts and combination of parts disclosed and defined in the appended claims.

What is claimed is:

1. A plasma torch, comprising
a torch housing,
a pair of electrical contacts in said housing in different planes, said contacts being included in an operating circuit,
an electrode supported in said housing,
a nozzle in operative association with the lower portion of said electrode,
nozzle supported means forming an upward extension thereof,
resilient means, disposed between said last mentioned means and said contacts, being of such a length as to require being urged by said last mentioned means to the extent of becoming deformed to engage both of said contacts,
whereby in the absence of said nozzle supported means or said nozzle, said resilient means does not engage said contacts, thus making said torch inoperative.

2. The structure of claim 1, wherein
said resilient means is formed as a coil spring.

3. The structure of claim 1, wherein
said contacts are included in the actuating circuit in said torch housing,

4. The structure of claim 1, wherein
said nozzle includes a nozzle cap.

5. The structure of claim 1, wherein
said resilient means is adapted to engage one of said contacts, and
said last mentioned means in operating position urges said resilient means to deform to engage the second of said contacts.

6. A plasma torch, comprising
a torch housing,
means secured in said housing having a pair of electrical contacts in different planes, said contacts being included in an operating circuit,
a tubular member depending from said means,
means disposed within said tubular member having an electrode depending therefrom,
a swirl tube about the lower portion of said tubular member and said electrode,
a nozzle operatively associated with said tubular member and supporting said swirl tube, and
a coil spring supported by said swirl tube, said coil spring being of such a length as to require said support to engage said contacts and in the absence of said swirl tube or said nozzle, said contacts are not engaged and said torch is inoperative.

7. The structure of claim 6, wherein
said nozzle includes a nozzle cap.

8. A plasma torch, comprising
a torch housing,
a plunger housing having a head portion secured in said housing,
a pair of electrical contacts in said head portion in different planes, said contacts being included in an operative circuit,
a pair of concentric tubular members depending from said head portion,
a plunger disposed in the inner of said tubular members having an electrode depending therefrom,
a nozzle in operative association with said electrode,
a swirl tube about said tubular member supported by said nozzle,
a coil spring supported by said swirl tube,
said coil spring being of such a length as to require its uppermost coil to become sufficiently deformed to engage both of said contacts,
whereby in the absence of said support of said nozzle or said swirl tube, said uppermost coil would not engage both of said contacts, thus causing said torch to be inoperative.

9. The structure of claim 8, wherein said plunger is a fixed conducting means to the electrode.

* * * * *